(12) United States Patent
Fukushima et al.

(10) Patent No.: US 10,987,975 B2
(45) Date of Patent: Apr. 27, 2021

(54) MOTORCYCLE TIRE

(71) Applicant: Sumitomo Rubber Industries, Ltd., Hyogo (JP)

(72) Inventors: Kazuki Fukushima, Kobe (JP); Yoshimasa Ueda, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 155 days.

(21) Appl. No.: 16/209,182

(22) Filed: Dec. 4, 2018

(65) Prior Publication Data

US 2019/0193470 A1 Jun. 27, 2019

(30) Foreign Application Priority Data

Dec. 25, 2017 (JP) .............................. JP2017-248055

(51) Int. Cl.
*B60C 11/03* (2006.01)
*B60C 11/11* (2006.01)

(52) U.S. Cl.
CPC ....... *B60C 11/0304* (2013.01); *B60C 11/0302* (2013.01); *B60C 11/11* (2013.01); *B60C 2011/0367* (2013.01); *B60C 2200/10* (2013.01)

(58) Field of Classification Search
CPC .. B60C 11/1384; B60C 11/0311; B60C 11/11; B60C 11/0302; B60C 11/03; B60C 11/0304; B60C 2011/0313
USPC .............................. D12/533–567; 152/209.15
See application file for complete search history.

(56) References Cited

U.S. PATENT DOCUMENTS

2010/0126645 A1 5/2010 Barboza et al.
2016/0082777 A1* 3/2016 Shimoyama ............ B60C 11/11
152/209.11

FOREIGN PATENT DOCUMENTS

| CN | 107415596 A | | 12/2017 | |
|---|---|---|---|---|
| JP | H01-311903 A | | 12/1989 | |
| JP | H09-109615 A | | 4/1997 | |
| JP | 11263104 A | * | 9/1999 | ............ B60C 11/13 |
| JP | 2001-039121 A | | 2/2001 | |
| JP | 2006-076520 A | | 3/2006 | |

(Continued)

OTHER PUBLICATIONS

Machine Translation: JP-11263104-A; Kurokawa, Makoto; (Year: 2020).*

(Continued)

*Primary Examiner* — Kendra Ly
(74) *Attorney, Agent, or Firm* — Studebaker & Brackett PC (57) ABSTRACT

A motorcycle tire is provided in the tread portion with first inclined main grooves and second inclined main grooves which are arranged alternately in the tire circumferential direction while inclining in opposite directions. The first inclined main grooves extend from a first tread edge toward a second tread edge across the tire equator and terminate at the respective second inclined main grooves which extend from the second tread edge toward the first tread edge across the tire equator and terminate at the respective first inclined main grooves which are respectively next to the above-said first inclined main grooves. A first region, which is delimited by the first tread edge, two of the first inclined main grooves and one of the second inclined main grooves, is provided with blocks whose ground contacting top surfaces have vertices each having an angle of not less than 45 degrees.

14 Claims, 4 Drawing Sheets

(56) References Cited

FOREIGN PATENT DOCUMENTS

JP          2016-060436 A      4/2016

OTHER PUBLICATIONS

The extended European search report issued by the European Patent Office dated Dec. 3, 2018, which corresponds to European Patent Application No. 18201891.1-1012 and is related to U.S. Appl. No. 16/209,182.

* cited by examiner

MOTORCYCLE TIRE

TECHNICAL FIELD

The present invention relates to a motorcycle tire, more particularly to a tread pattern.

BACKGROUND ART

Japanese Patent Application Publication No. 2016-60436 discloses a motorcycle tire wherein the tread portion is provided with a block tread pattern which can satisfy both of off-road performance and on-road performance.
This tread portion is however, liable to wear unevenly because the block tread pattern includes blocks whose ground contact surfaces have vertices of relatively small angles, from which uneven wear starts, therefore improvement is required.

SUMMARY OF THE INVENTION

Problems to be Solved by the Invention

It is therefore, an object of the present invention to provide a motorcycle tire, in which uneven wear of blocks can be effectively suppressed.

According to the present invention, a motorcycle tire comprises:
a tread portion curved convexly and having a first tread edge and a second tread edge,
the tread portion provided with first inclined main grooves and second inclined main grooves which are arranged alternately in the tire circumferential direction while inclining in opposite directions to each other,
wherein
the first inclined main grooves extend from the first tread edge toward the second tread edge across the tire equator and terminate at the respective second inclined main grooves which extend from the second tread edge toward the first tread edge across the tire equator and terminate at the respective first inclined main grooves which are respectively next to the above-said first inclined main grooves, whereby the tread portion is provided with a first region delimited by the first tread edge, two of the first inclined main grooves and one of the second inclined main grooves,
the first region is provided with blocks whose ground contacting top surfaces have vertices, and
the vertices each have an angle of not less than 45 degrees.
Further, the motorcycle tire according to the present invention may have the following features (1)-(7):
(1) first axial distances from the tire equator to intersections between the first inclined main grooves and the second inclined main grooves are in a range from 0.50 to 0.90 times a half developed tread width from the tire equator to the first tread edge;
(2) each of the first inclined main grooves and the second inclined main grooves comprises a main portion and an axially outer portion,
the main portion intersects the tire equator and is inclined at an angle θ2 with respect to the tire axial direction, and
the axially outer portion extends axially outwardly from the main portion to the adjacent first or second tread edge while inclining at an angle θ3 with respect to the tire axial direction which is smaller than the angle θ2;
(3) the first region is provided with at least one inclined sub-groove extending from the first tread edge to the above-said one of the second inclined main grooves delimiting the first region, while inclining in the same direction as the above-said two of the first inclined main grooves delimiting the first region;
(4) the above-said at least one inclined sub-groove includes a first inclined sub-groove which is continuous with the second inclined main groove at a position on the first tread edge side of the tire equator, and
a second inclined sub-groove which is continuous with the second inclined main groove at a position on the second tread edge side of the tire equator;
(5) each of the first inclined sub-groove and the second inclined sub groove is composed of
an axially outer gently inclined portion extending axially inwardly from the first tread edge while including at a smaller angle with respect to the tire axial direction, and
an axially inner steeply inclined portion extending from the gently inclined portion toward the tire equator while including at a larger angle than the gently inclined portion with respect to the tire axial direction;
(6) the first region is provided with inclined auxiliary grooves inclined in the same direction as the above-said one of the second inclined main grooves delimiting the first region;
(7) the inclined auxiliary grooves include a first inclined auxiliary groove disposed most closely to the first tread edge, and having a smaller depth than the above-said two of the first inclined main grooves delimiting the first region.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.
The standard pressure is the maximum air pressure for the tire specified by the same organization in the Air-pressure/Maximum-load Table or similar list.
For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like.

DESCRIPTION OF THE PREFERRED EMBODIMENTS

Embodiment of the present invention will now be described in detail in conjunction with accompanying drawings.

Figure 1:
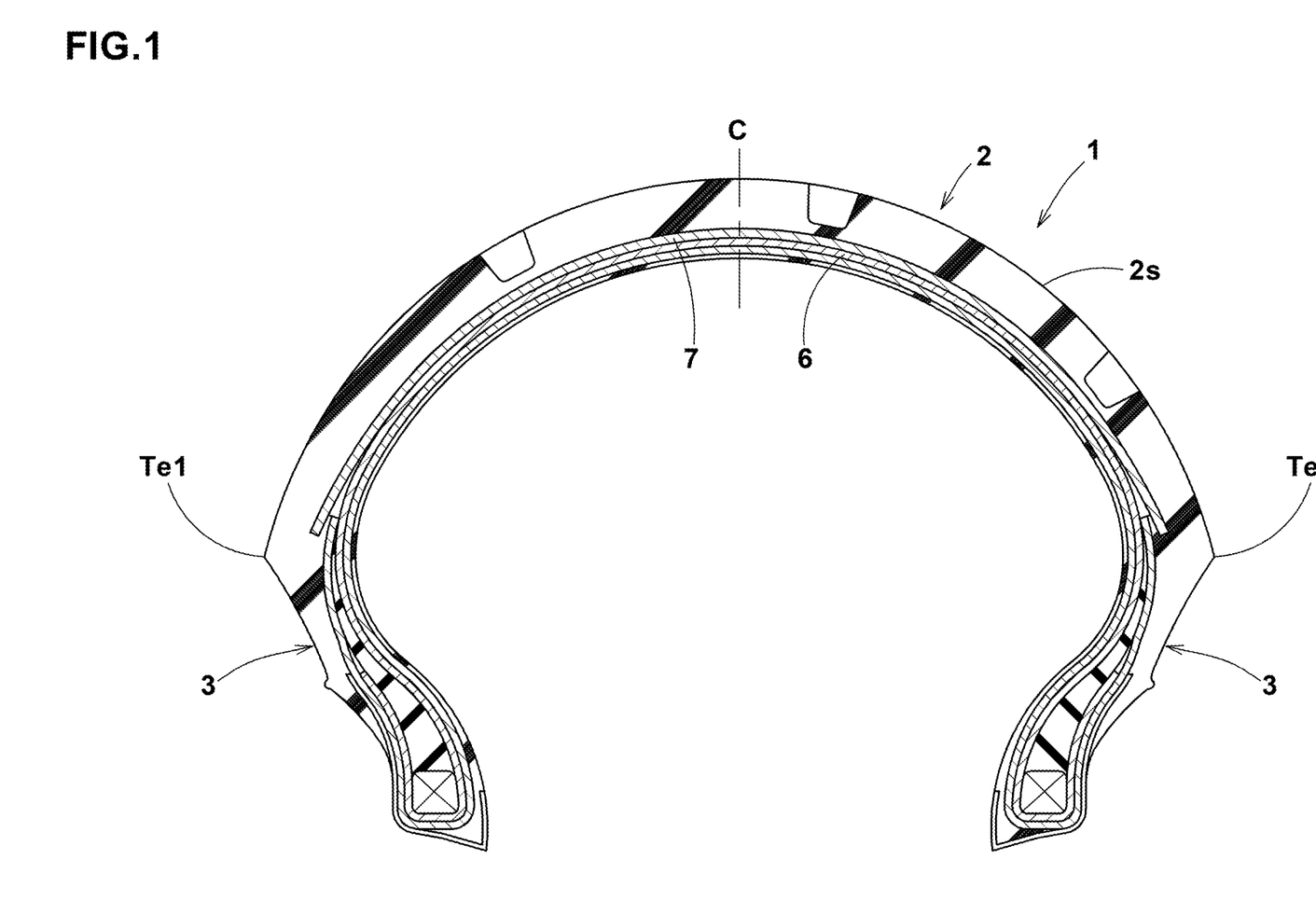
FIG. 1 is a cross sectional view of a motorcycle tire as an embodiment of the present invention taken along line A-A in FIG. 2

FIG. 1 shows an example of the internal structure of a motorcycle tire 1 as an embodiment of the present invention. In FIG. 1, the motorcycle tire 1 in its normal state is shown. In this embodiment, the motorcycle tire 1 is designed for a rear wheel. But, the present invention can be applied to a motorcycle tire for a front wheel.

Figure 2:
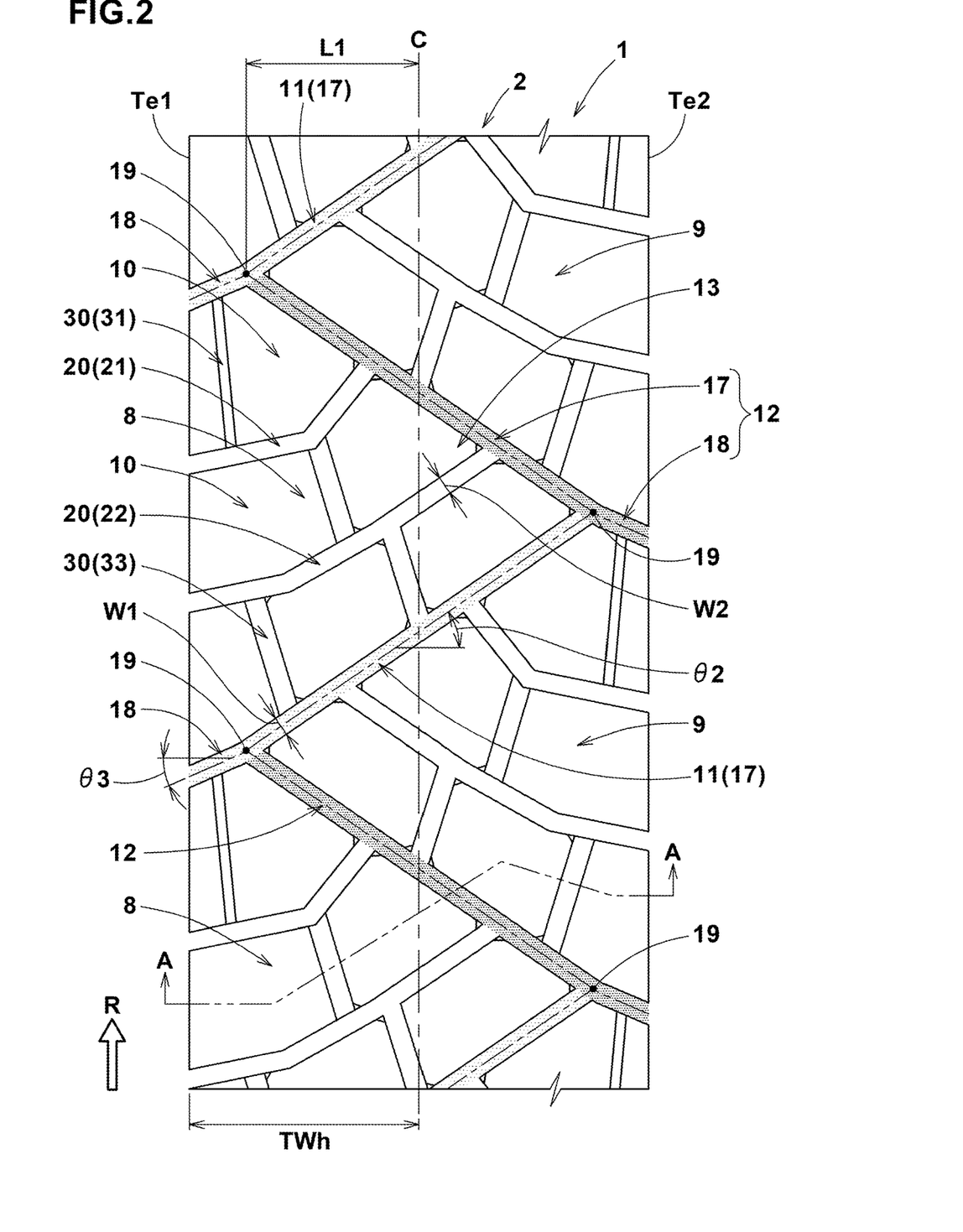
FIG. 2 is a developed partial view of the tread portion thereof.

The motorcycle tire 1 in this embodiment is provided with a tread pattern shown in FIG. 2 designed to satisfy both of off-road performance and on-road performance.

"As shown in FIG. 1, as usual, the pneumatic tire 1 comprises a tread portion 2 whose outer surface defines the tread surface 2s, a pair of axially spaced bead portions mounted on rim seats, a pair of sidewall portions 3 extending between the tread edges Te1 and Te2 and the bead portions, a carcass 6 extending between the bead portions through the tread portion and the sidewall portions, and a tread reinforcing layer 7 disposed radially outside the carcass in the tread portion."

"As a characteristic of a motorcycle tire, the tread portion 2 (inclusive of the carcass 6, tread reinforcing layer 7 and a tread rubber thereon) is convexly curved so that the tread surface 2s between the tread edges Te1 and Te2 is curved like an arc swelling radially outwardly, and the maximum cross sectional width of the tire 1 occurs between the tread edges."

The tread pattern in this example shown in FIG. 2 is a directional pattern in which the intended tire rotation direction R is specified. The intended tire rotational direction R is indicated in the sidewall portions 3 for example using letters, symbol and the like. According to the present invention, however, the tread pattern is not limited to directional patterns.

In order to form the tread pattern, the tread portion 2 is provided with tread grooves including first and second inclined main grooves 11 and 12.

In FIG. 2, the first and second inclined main grooves 11 and 12 are distinguished from each other by filling them with different dot patterns for easy identification.

The first and second inclined main grooves 11 and 12 are alternately arranged in the tire circumferential direction and inclined in opposite directions to each other.

The first inclined main grooves 11 extend from the first tread edge Te1 toward the second tread edge Te2 across the tire equator C and terminate at the respective second inclined main grooves 12 which extend from the second tread edge Te2 toward the first tread edge Te1 across the tire equator C and terminate at the respective first inclined main grooves 11 which are respectively next to the above-mentioned first inclined main grooves 11.

In this example, the first inclined main grooves 11 are inclined toward the intended tire rotational direction R while extending from the first tread edge Te1 toward the second tread edge Te2, and the second inclined main grooves 12 are inclined toward the intended tire rotational direction R while extending from the second tread edge Te2 toward the first tread edge Te1.

By the first inclined main grooves 11 and the second inclined main grooves 12, the tread portion 2 is divided into first regions 8 and second regions 9.

The first regions 8 are each delimited by the first tread edge Te1, two of the circumferentially adjacent first inclined main grooves 11 extending from the first tread edge Te1, and one of the second inclined main grooves 12 extending from the second tread edge Te2 and connected to the two first inclined main grooves 11.

The second regions 9 are each delimited by the second tread edge Te2, two of the circumferentially adjacent second inclined main grooves 12 extending from the second tread edge Te2, and one of the first inclined main grooves 11 extending from the first tread edge Te1 and connected to the two second inclined main grooves 12.

The first regions 8 and the second regions 9 are each provided with blocks.

Although the first regions 8 and the second regions 9 are alternately arranged in the tire circumferential direction, the shape of each first region 8 and the shape of each second region 9 are line symmetrical, and the block arrangement of each first region 8 and the block arrangement of each second region 9 are line symmetrical.

Next, the first region 8 is described in detail. The following description of the first region 8 can be applied to the second region 9 by interchanging the terms "first" and "second" and changing the reference numbers as appropriate. Therefore, a detailed description of the second region 9 is omitted as redundant As a result of various experiments, the present inventors found that, in the first and second regions 8 and 9 divided by the first inclined main grooves 11 and the second inclined main grooves 12, by setting the angles of all the vertices 13 of the ground contacting top surfaces of all the blocks to values of not less than 45 degrees, uneven wear of the vertices can be remarkably suppressed even if the angles of the vertices 13 are varied.

Figure 3:
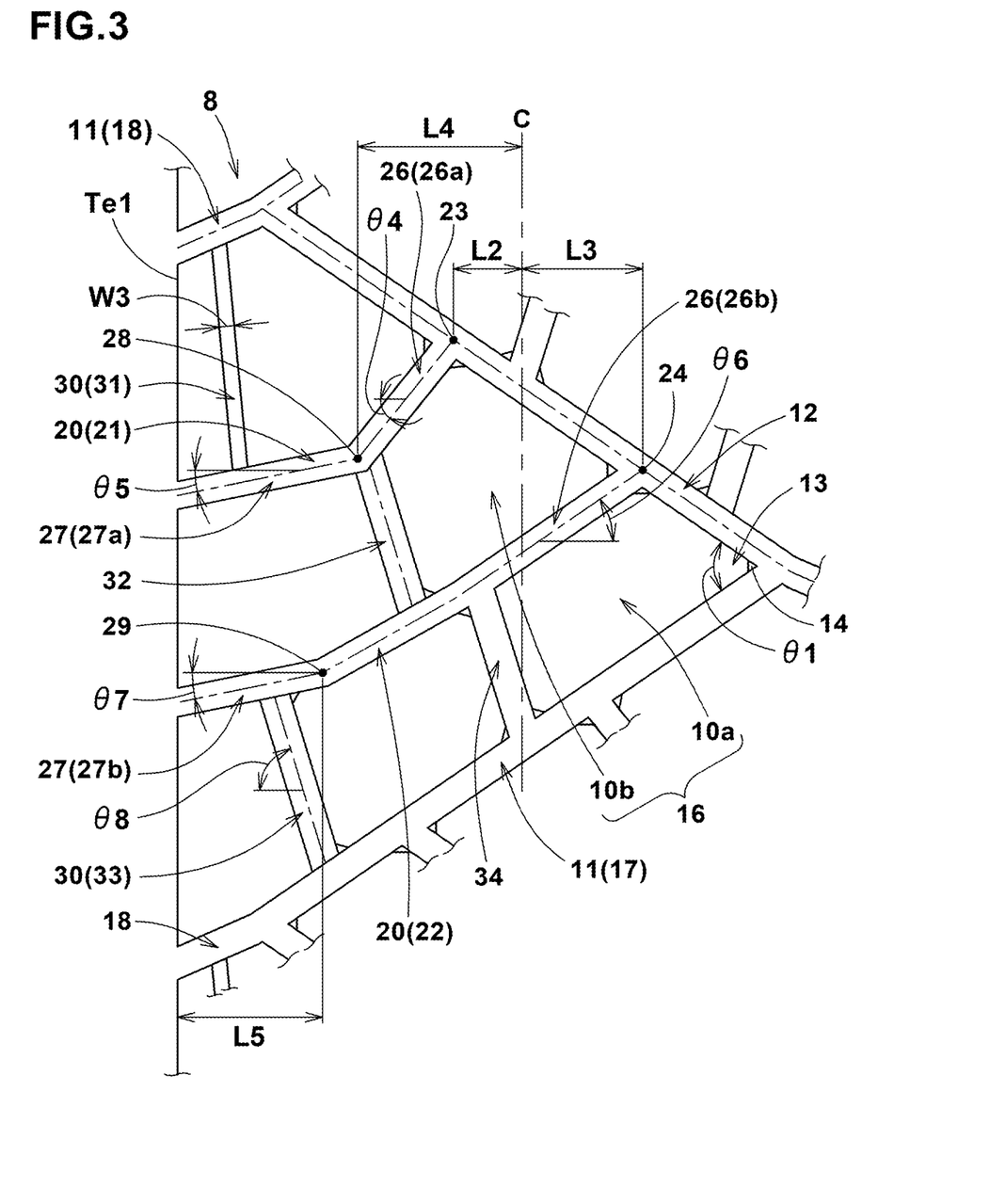
FIG. 3 is an enlarged partial view of the tread portion showing a first region (a second region is mirror symmetrical).

"As shown in FIG. 3, every vertex 13 or external corners of the ground contacting top surfaces of all the blocks 10 disposed in the first region 8 have angles θ1 of not less than 45 degrees. As a result, uneven wear of the blocks is effectively suppressed."

In the case where the vertex 13 is chamfered by a slope 14 as in this embodiment, the angle of the vertex 13 is measured supposing that the vertex 13 is not chamfered.

In order to enhance the above effect, it is preferred that the angles θ1 are not less than 55 degrees, more preferably not less than 60 degrees.

In this embodiment, the ground contacting top surfaces of the blocks 10 disposed in the first region 8 have various polygonal shapes including a four-sided shape, a five-sided shape and a six-sided shape. Here, the chamfered portions are ignored.

In the case of a four-sided shape, it is preferred that the angle θ1 is not more than 140 degrees, more preferably not more than 130 degrees. In the block 10 having such vertex, the vertex can easily dig into the ground, and it is possible to exhibit excellent off-road performance.

It is preferable that the ground contacting top surfaces of the blocks 10 disposed on the tire equator C, in other words, crossed by the tire equator C have substantially the same areas in order to further suppress the uneven wear of the blocks. More specifically, the ratio Sa/Sb of the ground contacting top surface areas Sa and Sb of each pair 16 of the adjacent blocks 10 is preferably set in a range from 1.00 to 1.20.

As shown in FIG. 2, each of the first inclined main groove 11 and the second inclined main groove 12 comprises a main portion 17 and an axially outer portion 18.

The main portion 17 intersects the tire equator C and is inclined at an angle θ2 of, for example, 30 to 40 degrees with respect to the tire axial direction.

The axially outer portion 18 extends from the main portion 17 to the tread edge Te1/Te2 while inclining at an angle θ3 with respect to the tire axial direction which is smaller than the angle θ2. The angle θ3 is set in a range from 20 to 30 degrees, for example. Such configuration of the first and second inclined main grooves 11 and 12 helps to secure the axial block rigidity in the vicinity of the tread edge in order to prevent the vehicle body from overly leaning when the vehicle body is leant largely by the rider.

In order to prevent the vehicle body from leaning overly from the intended leaning angle while maintaining easiness and stability when leaning the vehicle body to initiate turn during running straight, the first axial distances from the tire equator C to the intersections 19 between the first inclined main grooves 11 and the second inclined main grooves 12 are preferably set in a range from 0.50 to 0.90 times a half developed tread width TWh.

Here, the half developed tread width TWh is a distance along the outer surface of the tread portion 2 from the tire equator C to the tread edge.

In this application, the lengths and distances of the components of the tread pattern refer to those measured along the outer surface of the tread part unless otherwise noted.

Preferably, the second inclined main groove 12 is connected to the junction of the main portion 17 and the axially outer portion 18 of the first inclined main groove 11, and the first inclined main groove 11 is connected to the junction of the main portion 17 and the axially outer portion 18 of the second inclined main groove 12.

The first and second inclined main grooves 11 and 12 preferably have a groove width W1 in a range from 5.0% to 10.0% of the half developed tread width TWh.

The first and second inclined main grooves 11 and 12 preferably have a groove depth in a range from 4 to 7 mm.

In this embodiment, the first region 8 is provided with inclined sub-grooves 20 and inclined auxiliary grooves 30.

The inclined sub-grooves 20 extend obliquely in the same direction as the first inclined main grooves 11 from the second inclined main groove 12 to the first tread edge Te1. The groove width W2 of the inclined sub-grooves 20 is preferably set in a range from 5.0% to 10.0% of the half developed tread width TWh.

The groove depth of the inclined sub-grooves 20 is preferably set in a range from 4 to 7 mm. In this example, the inclined sub-grooves 20 have the same groove depth as the second inclined main grooves 12.

As shown in FIG. 3, the inclined sub-grooves 20 in this example include a first inclined sub-groove 21 and a second inclined sub-groove 22.

The first inclined sub-groove 21 extends from the first tread edge Te1 and is continuous with the second inclined main groove 12 on the first tread edge Te1 side of the tire equator C.

The second inclined sub-groove 22 extends from the first tread edge Te1 and is continuous with the second inclined main groove 12 on the second tread edge Te2 side of the tire equator C.

The second axial distance L2 from the tire equator C to the intersection 23 between the first inclined sub-groove 21 and the second inclined main groove 12 is preferably set in a range from 0.15 to 0.25 times the half developed tread width TWh in order to improve the on-road performance and off-road performance in a well-balanced manner.

From the same viewpoint, it is preferable that the third axial distance L3 from the tire equator C to the intersection 24 of the second inclined sub-groove 22 and the second inclined main groove 12 is set in a range from 0.25 to 0.40 times the half developed tread width TWh.

Each of the first inclined sub-groove 21 and the second inclined sub-groove 22 comprises an axially inner steeply inclined portion 26 and an axially outer gently inclined portion 27.

The steeply inclined portion 26 extends from the second inclined main groove 12, while inclining at an angle (θ4, θ6) with respect to the tire axial direction.

The gentle sloped portion 27 extends from the steeply inclined portion 26 to the tread edge, while inclining at an angle (θ5, θ7) smaller than the angle (θ4, θ6) with respect to the tire axial direction.

Such configuration of the first and second inclined sub grooves 21 and 22 helps to secure the axial block rigidity in the vicinity of the tread edge in order to prevent the vehicle body from overly leaning when the vehicle body is leant largely by the rider.

It is preferable that the angle θ4 of the steeply inclined portion 26a of the first inclined sub-groove 21 is set to be larger than the angle θ2 of the first inclined main groove 11. Preferably, the angle θ4 is set in a range from 45 to 55 degrees. Such first inclined sub-groove 21 helps to improve wet performance during straight running and also during cornering with relatively small leaning angles.

The angle θ5 of the gently inclined portion 27a of the first inclined sub-groove 21 is smaller than the angle θ4, and preferably smaller than the angle θ2 of the main portion 17 of the first inclined main groove 11.

Preferably, the angle θ5 is set in a range from 5 to 15 degrees.

The fourth axial distance L4 from the tire equator C to the junction 28 of the steeply inclined portion 26a and the gently inclined portion 27a of the first inclined sub-groove 21 is preferably set in a range from 0.40 to 0.50 times the half developed tread width TWh in order to make the feedback when leaning the vehicle body linear to improve the roll characteristics.

It is preferable that the angle θ6 of the steeply inclined portion 26b of the second inclined sub-groove 22 is smaller than the angle θ4 of the steeply inclined portion 26a of the first inclined sub-groove 21. Preferably, the angle θ6 is set in a range from 30 to 40 degrees.

The angle θ7 of the gently inclined portion 27b of the second inclined sub-groove 22 is smaller than the angle θ6 of the steeply inclined portion 26b of the second inclined sub-groove 22, and preferably set in a range from 5 to 15 degrees. More preferably, the angle θ7 of the gently inclined portion 27b of the second inclined sub-groove 22 is set to be the same as the angle θ5 of the gently inclined portion 27a of the first inclined sub-groove 21, namely the gently inclined portion 27b is parallel with the gently inclined portion 27a, therefore, uneven wear of the blocks adjacent thereto can be suppressed.

In order to improve the uneven wear resistance and the roll characteristics, it is preferred that the junction 29 of the steeply inclined portion 26b and the gently inclined portion 27b of the second inclined sub-groove 22 is located closer to the first tread edge Te1 than the junction 28 of the first inclined sub-groove 21.

The fifth axial distance L5 from the first tread edge Te1 to the junction 29 is preferably set in a range from 0.20 to 0.35 times the half developed tread width TWh.

In the first region 8 delimited by the first tread edge Te1, the two first inclined main grooves 11 and the one second inclined main groove 12, the inclined auxiliary grooves 30 are connected to the inclined auxiliary grooves 20, and inclined in the same direction as the second inclined main groove 12. But, in this example, with respect to the tire axial direction, the angles θ8 of the inclined auxiliary grooves 30 are larger than any of the inclined sub-grooves 20. Preferably, the angles θ8 are larger than the angle θ2 of the main portion 17 of the first inclined main groove 11. Specifically, the angles θ8 are preferably set in a range from 70 to 85 degrees. Such inclined auxiliary grooves 30 help to improve the cornering performance in off-road running.

The inclined auxiliary grooves 30 in this example include a first inclined auxiliary groove 31, a second inclined auxiliary groove 32, a third inclined auxiliary groove 33, and a fourth inclined auxiliary groove 34.

The first inclined auxiliary groove 31 extends from the axially outer portion 18 of the first inclined main groove 11 to the gentle inclined portion 27a of the first inclined auxiliary groove 21, therefore, the first inclined auxiliary groove 31 is closest to the first tread edge Te1 among the inclined auxiliary grooves 30.

The depth of the first inclined auxiliary groove 31 is preferably smaller than the depth of the first inclined main groove 11, for example, not more than 0.60 times, more preferably 0.35 to 0.50 times the depth of the first inclined main groove 11. More preferably, the first inclined auxiliary groove 31 has the smallest depth among the inclined auxiliary grooves 30. The first inclined auxiliary groove 31 configured as above can help to enhance the off-road performance while maintaining the uneven wear resistance.

In order to enhance the above-mentioned effect, for example, the first inclined auxiliary groove 31 preferably has a groove width W3 smaller the groove width W1 of the first and second inclined main grooves 11 and 12. Preferably, the groove width W3 is set to be not more than 0.70 times the groove width W1, more preferably in a range from 0.40 to 0.60 times the groove width W1. Preferably, the groove width W3 is smallest among the inclined auxiliary grooves 30.

The second inclined auxiliary groove 32 extends from the first inclined sub-groove 21 to the second inclined sub-groove 22.

In this example, the second inclined auxiliary groove 32 extends from the junction 28 of the steeply inclined portion 26a and the gently inclined portion 27a of the first inclined sub-groove 21 to the steeply inclined portion 26b of the second inclined sub-groove 22, and a Y-shaped intersection is formed by the second inclined auxiliary groove 32 and the inclined portions 26a and 27a. Thereby, on-road wet performance and off-road performance can be improved.

In this example, it is preferable that the second inclined auxiliary groove 32 has a groove depth larger than that of the first and second inclined main grooves 11 and 12. Preferably, the groove depth of the second inclined auxiliary groove 32 is gradually decreased toward the intended tire rotational direction R in order to suppress uneven wear of the blocks on both sides of the second inclined auxiliary groove 32.

The third inclined auxiliary groove 33 and the fourth inclined auxiliary groove 34 extend from the first inclined main groove 11 to the second inclined auxiliary groove 22.

In this example, the third inclined auxiliary groove 33 extends from the main portion 17 of the first inclined main groove 11 to the gently inclined portion 27b of the second inclined auxiliary groove 22, and the fourth inclined auxiliary groove 34 extends from the main portion 17 of the first inclined main groove 11 to the steeply inclined portion 26b of the second inclined auxiliary groove 22.

Such arrangement of the inclined auxiliary grooves 30 in this example help to further improve the uneven wear resistance.

Comparison Tests

Motorcycle tires having the internal structure shown in FIG. 1 were experimentally manufactured as test tires (Ex1-Ex8 and Ref1) in two sizes, 120/70R17 for front wheel (rim size 3.50×17) and 160/60R17 for rear wheel (rim size 4.50×17).

The test tires Ex1-Ex8 had tread patters based on the tread pattern shown in FIG. 2.

Figure 4:
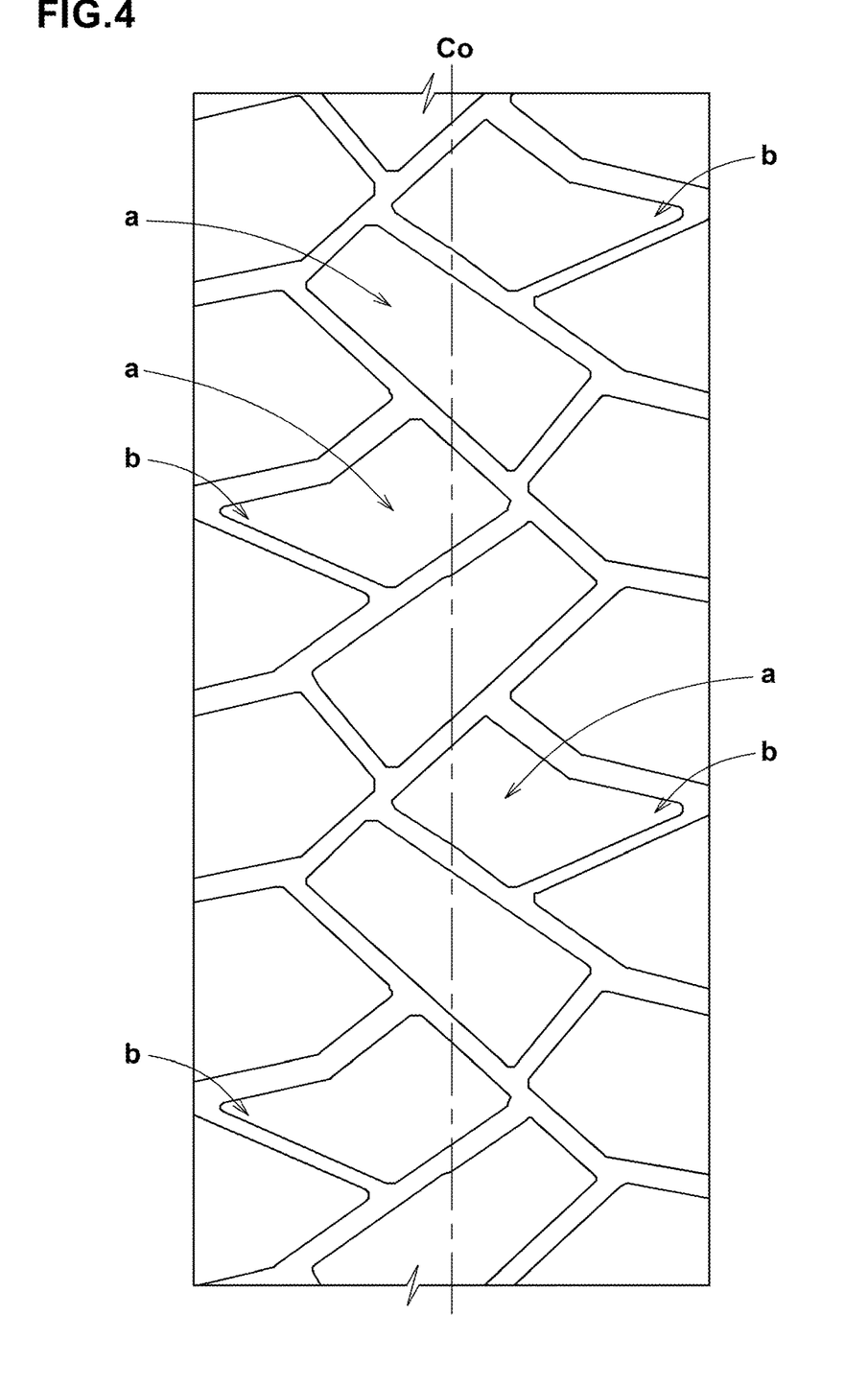
FIG. 4 is a developed partial view of a tread portion of a motorcycle tire as a comparative example.

The comparative test tire Ref1 had the tread pattern shown in FIG. 4, wherein vertices (b) of the ground contacting top surfaces of the blocks had angles of less than 45 degrees.

The specifications of the test tires are shown in Table 1.

Using a 500 cc motorcycle on the front and rear wheels of which the test tires were mounted (front and rear tire pressure 250 kPa), the following tests for uneven wear resistance, on-road performance and off-road performance were carried out.

<Uneven Wear Resistance Test>

After running for 5,000 km on paved roads, the amount of wear of the vertex having the smallest angle among the blocks provided in the first region was measured. The reciprocal of the measured amount of wear is shown in Table 1 by an index based on the comparative tire Ref1 being 100, wherein the larger the numerical value, the smaller the amount of wear, namely, the higher the uneven wear resistance.

<On-Road Performance Test>

During running on paved roads, the test rider evaluated running performance. The results are indicated in Table 1 by an index based on the comparative tire Ref1 being 100, wherein the larger the numerical value, the better the on-road performance.

<Off-Road Performance Test>

During running on rough terrain, the test rider evaluated running performance. The results are indicated in Table 1 by an index based on the comparative tire Ref1 being 100, wherein the larger the numerical value, the better the off-road performance.

TABLE 1

| Tire | Ref1 | Ex1 | Ex2 | Ex3 | Ex4 | Ex5 | Ex6 | Ex7 | Ex8 |
| --- | --- | --- | --- | --- | --- | --- | --- | --- | --- |
| Tread Pattern(Fig. No.) | 4 | 2 | 2 | 2 | 2 | 2 | 2 | 2 | 2 |
| Minimum angle θ1 of block vertices (deg) | 36 | 67 | 50 | 55 | 60 | 67 | 67 | 67 | 67 |
| 1st distance L1/Wh | 0.63 | 0.71 | 0.71 | 0.71 | 0.71 | 0.50 | 0.60 | 0.80 | 0.90 |
| Uneven wear resistance | 100 | 112 | 107 | 109 | 111 | 112 | 112 | 110 | 108 |
| On-road performance | 100 | 105 | 103 | 102 | 104 | 102 | 104 | 105 | 105 |
| Off-road performance | 100 | 102 | 103 | 103 | 102 | 100 | 102 | 102 | 102 |

From the test results, it was confirmed that, in the motorcycle tires according to the present invention, uneven wear of the blocks can be suppressed while exhibiting excellent on-road performance and off-road performance.

While detailed description has been made of preferable embodiments of the present invention, the present invention can be embodied in various forms without being limited to the illustrated embodiments.

DESCRIPTION OF THE REFERENCE SIGNS 2 tread portion
8 first region
9 second region
10 block
11 first inclined main groove
12 second inclined main groove
13 vertex
C tire equator
Te1 first tread edge
Te2 second tread edge

The invention claimed is:

1. A motorcycle tire comprising:
a tread portion curved convexly and having a first tread edge and a second tread edge,
the tread portion provided with first inclined main grooves and second inclined main grooves which are arranged alternately in the tire circumferential direction while inclining in opposite directions to each other, wherein
the first inclined main grooves extend from the first tread edge toward the second tread edge across the tire equator to the respective second inclined main grooves which extend from the second tread edge toward the first tread edge across the tire equator to the respective first inclined main grooves which are respectively next to the above-said first inclined main grooves,
the tread portion is provided with a first region delimited by the first tread edge, two of the first inclined main grooves and one of the second inclined main grooves,
all blocks disposed in the first region respectively have ground contacting top surfaces each of which has vertices each having an angle of not less than 45 degrees in a block top view,
each of the first inclined main grooves and the second inclined main grooves comprises a main portion and an axially outer portion,
the main portion extends across the tire equator and is inclined at an angle θ2 with respect to the tire axial direction,
the axially outer portion extends axially outwardly from the main portion to the adjacent first or second tread edge while inclining at an angle θ3 with respect to the tire axial direction which is smaller than the angle θ2,
the first region is provided with inclined sub-grooves each extending from the first tread edge to said one of the second inclined main grooves delimiting the first region, while inclining in the same direction as said two of the first inclined main grooves delimiting the first region,
the inclined sub-grooves include:
a first inclined sub-groove which is continuous with the second inclined main groove at a position on the first tread edge side of the tire equator, and
a second inclined sub-groove which is continuous with the second inclined main groove at a position on the second tread edge side of the tire equator,
each of the first inclined sub-groove and the second inclined sub-groove is composed of:
an axially outer gently inclined portion extending axially inwardly from the first tread edge while including at a smaller angle with respect to the tire axial direction, and
an axially inner steeply inclined portion extending from the gently inclined portion toward the tire equator while including at a larger angle than the smaller angle of the gently inclined portion with respect to the tire axial direction,
the first region is provided with a first inclined auxiliary groove, a second inclined auxiliary groove, a third inclined auxiliary groove, and a fourth inclined auxiliary groove,
the first inclined auxiliary groove extends from the axially outer portion of one of the two first inclined main grooves to the gently inclined portion of the first inclined sub-groove,
the second inclined auxiliary groove extends from a junction of the steeply inclined portion and the gently inclined portion of the first inclined sub-groove to the steeply inclined portion of the second inclined sub-groove,
the third inclined auxiliary groove extends from the main portion of the other of the two first inclined main grooves to the gently inclined portion of the second inclined sub-groove, and
the fourth inclined auxiliary groove extends from the main portion of the other of the two first inclined main grooves to the steeply inclined portion of the second inclined sub-groove.

2. The motorcycle tire according to claim 1, wherein
first axial distances from the tire equator to intersections between the first inclined main grooves and the second inclined main grooves are in a range from 0.50 to 0.90 times a half developed tread width from the tire equator to the first tread edge.

3. The motorcycle tire according to claim 1, wherein
the tread portion comprises the first region repeatedly arranged circumferentially of the tire, and a second region which is mirror symmetrical of the first region and is repeatedly arranged circumferentially of the tire, and
the repeatedly arranged first regions and the repeatedly arranged second regions are staggered along the tire equator.

4. The motorcycle tire according to claim 1, wherein
in cases where the vertices include a vertex chamfered by a slope, the angle of the chamfered vertex is determined supposing that it is not chamfered.

5. The motorcycle tire according to claim 1, wherein
the first and second inclined auxiliary grooves are inclined in the same direction as said one of the second inclined main grooves delimiting the first region.

6. The motorcycle tire according to claim 5, wherein
the first inclined auxiliary groove has a smaller depth than said two of the first inclined main grooves delimiting the first region.

7. The motorcycle tire according to claim 1, wherein
the first and second inclined main grooves have a groove depth, and
the first inclined auxiliary groove has a depth in a range from 0.35 to 0.50 times the depth of the first and second inclined main grooves.

8. The motorcycle tire according to claim 7, wherein the first and second inclined main grooves have a groove width, and the first inclined auxiliary groove has a groove width in a range from 0.40 to 0.60 times the groove width of the first and second inclined main grooves.

9. The motorcycle tire according to claim 8, wherein the second inclined auxiliary groove has a groove depth larger than that of the first and second inclined main grooves.

10. The motorcycle tire according to claim 1, wherein in the first region, the first inclined auxiliary groove, the second inclined auxiliary groove, the third inclined auxiliary groove, and the fourth inclined auxiliary groove are inclined in the same direction with respect to the tire circumferential direction.

11. The motorcycle tire according to claim 10, wherein the first inclined auxiliary groove, the second inclined auxiliary groove, the third inclined auxiliary groove, and the fourth inclined auxiliary groove are straight grooves.

12. The motorcycle tire according to claim 11, wherein the main portion and the axially outer portion of each of the first inclined main grooves extend linearly, and the main portion and the axially outer portion of each of the second inclined main grooves extend linearly.

13. The motorcycle tire according to claim 12, wherein the steeply inclined portion and the gently inclined portion of each of the first inclined sub-groove extend linearly.

14. The motorcycle tire according to claim 13, wherein the steeply inclined portion and the gently inclined portion of each of the second inclined sub-groove extend linearly.

* * * * *